May 2, 1961   R. C. SCOTT   2,982,127
STRAIN GAGE
Filed June 7, 1957   2 Sheets-Sheet 1

Inventor
Robert C. Scott
by Robert S. Topezer Atty.

May 2, 1961   R. C. SCOTT   2,982,127
STRAIN GAGE
Filed June 7, 1957   2 Sheets-Sheet 2
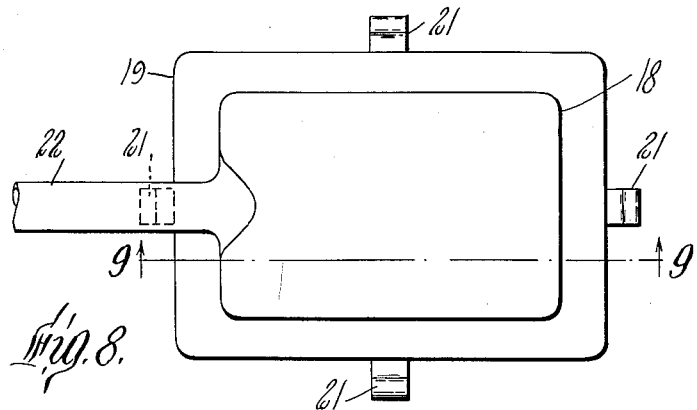
Fig. 8.
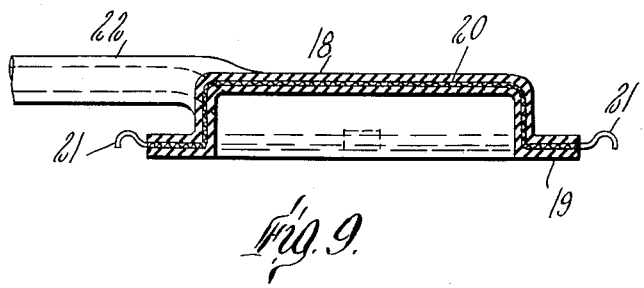
Fig. 9.
Fig. 10.
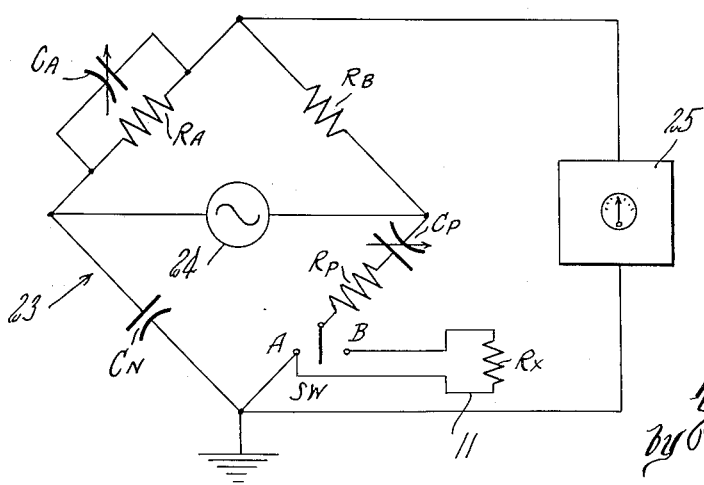
Inventor
Robert C. Scott
by Robert S. Toperzer
Atty.

2,982,127

STRAIN GAGE

Robert C. Scott, Belmont, Mass., assignor to George F. Cummings, Jr., Dumont, and Daniel Wagner, Westwood, N.J., as trustees Filed June 7, 1957, Ser. No. 664,224

6 Claims. (Cl. 73—88.5)

This invention relates to the measurement of small displacements, and more particularly it relates to gaging apparatus of a type which is especially well suited to the measurement of physical deformations or strains.

In the practical arts, an important field of investigation is the analysis of stress in terms of the strains set up within an object which may be determined from measurements of the deformations or movements in the surface of the object. The relation between stress and strain in actual physical bodies is described by Hookes law which states that within the elastic limit of a body, the ratio of stress to strain is a constant. Hence, if a bar of uniform cross-sectional area A, and length L, is subjected to a longitudinal tension F, it will be found that the bar has been elongated by a small amount $\Delta L$, the increase in length per unit of original length $$\frac{\Delta L}{L}$$

being the numerical measure of the strain $e$ produced in the bar. The stretching force per unit of sectional area, $$\frac{F}{A}$$

is the numerical measure of the stress in the bar so that the ratio of stress to strain, E, may be written:

$$E = \frac{F/A}{\Delta L/L} = \frac{FL}{(A)(\Delta L)}$$

where E is a constant called the modulus of elasticity or Young's modulus. For steel, E is about 30,000,000 pounds per square inch, and since a typical value of the elastic limit for steel is around 30,000 pounds per square inch, the strain $e$ in the case of steel, is generally smaller than 0.1 percent. For rubber, where the strains are relatively large, a typical value of E is around 300 pounds per square inch.

At the same time as the extension in the longitudinal direction occurs, there will also be a transverse contraction of the bar. For an elastic material the transverse negative strain $e'$ bears a constant relation to the longitudinal strain $e$, in accordance with Navier's law which states that every extension is accompanied by a transverse contraction proportional to the extension. Thus, $e' = -\mu e$ where the constant $\mu$ is known as Poisson's ratio, and may be defined as the ratio between the transverse contraction per unit dimension of the bar and its elongation per unit of length. Typical values of $\mu$ are 0.244 for glass, 0.333 for copper, 0.303 for steel, and 0.15 for concrete. For most metals Poisson's ratio lies between 0.25 and 0.35.

In the foregoing elementary exposition only the elementary states of stress and strain have been considered. In practice, the problem is usually much more complex because strains in three dimensions are involved. However, by means of other known formulae any state of stress within a body may be reduced to a combination of simple stresses, of which one stress of the combination will invariably be the maximum stress.

Stress is usually analyzed experimentally by means of one or more measuring elements affixed to the surface of the object to be tested in such a manner that strains in the three coordinate directions may be measured simultaneously. A common type of measuring element is a resistance wire arranged in a zigzag pattern on an insulating carrier so as to form a flat grid of relatively closely spaced parallel wire sections. The wire is embedded in a layer of cement and in this way is united firmly with the insulating carrier, which in turn is cemented to the surface of the object, with the closely spaced wire sections oriented parallel to the direction of the strain to be measured. This type of measuring element is known as an electric-resistance bonded-wire strain gage and it depends for its operation on the fact that the wire sections change in resistance when stretched (or compressed) in proportion to changes in their length. Thus, when a stress is placed upon the object causing it to elongate, the wire sections will be elongated correspondingly, and their cross-sectional dimension will be decreased in accordance with Navier's law. An indication of the relative amount of the elongation or strain is obtained from a measure of the resulting increase in resistance of the wire. Other forms of electric-resistance bonded-wire strain gages comprise flat grids superimposed on one another; flat grids adjacent to one another and with their axes in various angular relations; and helically wound grids. The particular form or pattern of the wire resistance grid which is most desirable depends upon various factors and in particular upon the directions of the applied forces with respect to the "axis" of the gage.

There is generally associated with this type of strain gage a gage factor which takes into account the effects of grid geometry, slippage or creep, and other sources of error that are inherent in the gage. The gage factor is related to but is usually less than the strain sensitivity of the strain gage wire, and must be determined experimentally by the manufacturer. Gages with relatively high stability and accuracy have a factor of approximately 2.0. For static loads, a strain of 0.16 percent is a tolerable maximum value, and in the case of dynamic measurements the maximum strain is usually 0.1 percent. Hence, the maximum unit resistance change for these gages is only in the neighborhood of 0.32 percent, which is extremely difficult to measure in a precise manner, especially under actual operating conditions.

It is an object of the present invention, therefore to provide a more sensitive apparatus for measuring small lineal displacements such as are associated with strains.

Another object of the invention is to provide a strain gage wherein the slippage or creep between the measuring element and the test object is much smaller than in conventional gages so that more accurate measurements may be obtained.

Another object of the invention is to provide a strain gage which is sensitive only to deformations in one selected direction.

Still another object of the invention is to provide a strain gage which employs wire of relatively large cross-sectional area and consequently is less fragile and can carry larger currents than the wire employed in conventional strain gages.

The novel features of the invention together with further objects and advantages thereof will become apparent from the following description of a preferred embodiment of the invention illustrated in the accompanying drawings. In the drawings.

Figure 2:
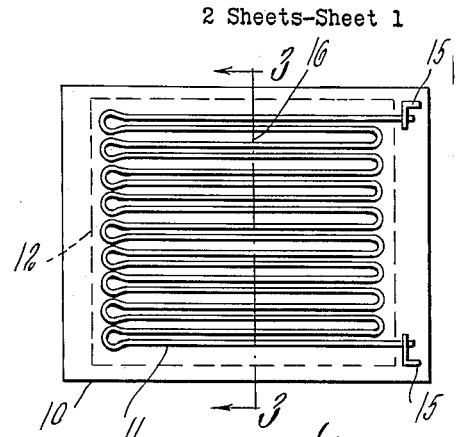
Fig. 2 is a greatly enlarged plan view of a strain gage measuring element in accordance with the present invention.

Figs. 4, 5, 6, and 7 illustrate modifications of the measuring element as shown in Fig. 2;

Fig. 8 is a plan view of a protective shield for the strain gage measuring elements according to the invention;

Fig. 9 is a sectional view taken on line 9—9 of Fig. 8; and

Fig. 10 is a schematic diagram of a circuit for measuring the resistance of the gaging elements to an alternating current of radio frequency.

When a pair of electrical conductors are disposed in close proximity to one another it has been found that their resistance to an alternating current of radio frequency is significantly greater than would be the case otherwise due to the asymmetrical distribution of current density in the conductors produced by the interaction of the magnetic fields surrounding them. This phenomenon is known as the proximity effect, and the ration of the alternating-current resistance when the conductors are near each other to the alternating-current resistance when conductors are isolated is known as the proximity effect ratio usually designated $R'/R$. In the case of two round, round, solid or tubular straight parallel conductors, the current will be more dense toward the inner (adjacent) sides of the conductors if the current flows in opposite directions in the two conductors, whereas the current will be more dense toward the outer (remote) sides of the conductors if the current flows in the same direction. For two straight parallel flat strap or foil conductors lying edge-to-edge, the distribution of current is influenced by the ratio of width to thickness of the conductors, but it will be similar to that of round conductors.

Figure 1:
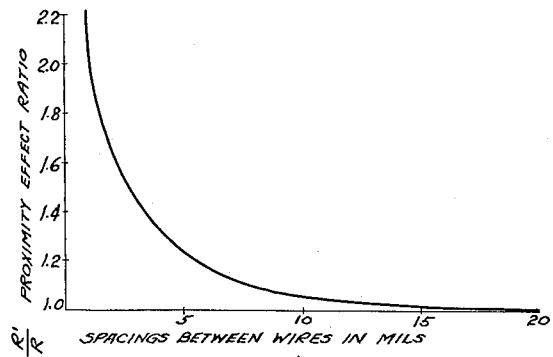
Fig. 1 is a graph illustrating the effect which the spacing of a pair of electrical conductors has on their resistance to an alternating current of radio frequency.

By way of illustration, Fig. 1 shows the proximity effect ratio for two straight parallel copper wires plotted as a function of their spacing. The size of the wires is No. 30 A.W.G. and the frequency of the alternating current to which the plot applies is ten megacycles, with the current flowing in opposite directions in the wires. From Fig. 1 it will be seen that the proximity effect ratio changes markedly throughout a range of various proximate spacings of the wires, and further that it increases sharply at reduced spacings where the values of the proximity effect ratio approach an asymptote. For conductors of different materials, sizes and shapes, and for different alternating current frequencies, the relation between the proximity effect ratio of the conductors and their spacing will be similar to that shown in Fig. 1, although the rates of change of the ratio may vary considerably.

The measuring apparatus of the present invention makes use of the proximity effect in that movements in the surface of an object whose strain is to be gaged are translated according to the invention into proportional changes in the spacing between a plurality of parallel conductor sections. As a consequence, the resistance of the parallel conductor sections to an alternating current is caused to change, and a measure of these resistive changes serves to indicate the surface movements or strains.

Figure 3:
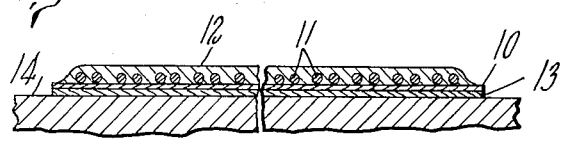
Fig. 3 is a sectional view taken on line 3—3 of Fig. 2.

Figs. 2 and 3 are magnified views of a strain gage measuring element in accordance with the invention wherein the numeral 10 designates a thin insulating base or carrier to which a zigzag wire element 11 is bonded by a layer of cement 12. Another layer of cement 13 is utilized to bond the base 10 to the surface of a test object 14, and the terminal ends 15 of the wire element 11 are adapted to be connected to a resistance measuring circuit to be described hereinafter. The gage axis 16 indicates the direction of the principal strain in the test object which is to be measured. The geometry of the wire element 11 is thus seen to comprise a series of hairpin-shaped loops with the two arms or sections of each loop much closer together than the adjacent arms of successive loops. When an alternating current of radio frequency is passed through the wire element 11, the loops will, therefore, have little or no effect on one another and only the mutual effects of the currents in the individual arms or sections of each loop will be a factor.

In operation, movements or deformations of the surface of the test object are translated, via the bonding and the insulating base to the wire element in such a manner that the spacing between the parallel sections of the wire element is caused to change. This, in turn, causes the resistance of the wire element to change in accordance with the proximity effect as described in the foregoing, which change is then measured to provide an indication of the strain. The only strain to which the wire itself will be subjected occurs at the ends of the parallel sections where the wire is looped or bent, and since this is a proportionately small fraction of the total length of the wire element, the effect on the alternating current resistance of the strain in these loops will be negligible. This feature of construction also reduces the bonding strains between the gage and test object and thus minimizes "creep" of the gage. In the case of flat strip or foil conductor elements even relatively large cross-sectional shapes may be used without creating any appreciable problems on account of strains in the conductors by reducing the cross-sectional area at the loops or bends.

The elastic properties of the wire element and the insulating base in which the wire element is embedded, and also the elastic properties of the cement or bonding materials should be as nearly like the elastic properties of the test object as possible in order that the surface movements of the test object will be faithfully and synchronously reproduced. The elastic properties of the wire element are therefore, of importance only to assure that proportionate changes occur in the spacing of the parallel conductor sections.

Figure 4:
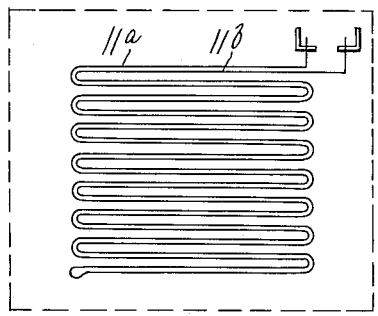

It is contemplated that the geometry of the wire element or grid may be varied considerably, either for the purpose of providing measurements of stress or strain in more than one direction, or to realize optimum results for different operating conditions. Thus, Fig. 4 is a magnified plan view of a grid formed in effect with a pair of closely-spaced insulated parallel wires 11a and 11b arranged in a zigzag pattern. As shown, the spacing between the two wires (indicated diagrammatically as single lines), is substantially less than the spacing between the loops of the pattern so that the currents in each pair of closely-spaced parallel wire sections will have little or no effect on adjacent pairs of closely-spaced parallel wire sections. The wires are connected at one end to form a return circuit so that the same alternating-current flows in opposite directions in the closely spaced sections as is the case in Fig. 2.

Figure 5:
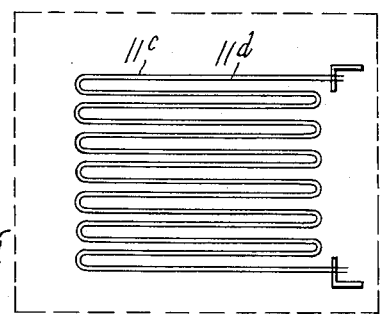

Fig. 5 illustrates a geometry wherein two insulated wires 11c and 11d are oriented in a zigzag pattern similar to that shown in Fig. 4 except that the wires are electrically connected at both ends to form two parallel paths for current flow in the same direction. The spacing between the two wires is much less than the spacing between the loops of the pattern as is the case in Fig. 4.

Figure 6:
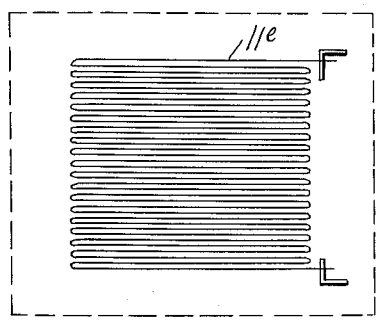

Fig. 6 illustrates a geometry wherein a single insulated wire element 11e is arranged in a zigzag pattern having parallel sections of equal spacing throughout. In this case, the current flows in opposite directions in the adjacent wire sections and interaction occurs between more than two sections.

Figure 7:
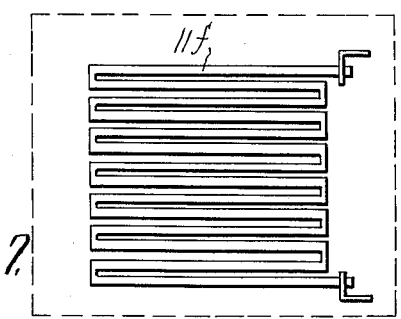

Fig. 7 shows a strip or foil type of conductor or wire element 11f, which is arranged in a manner similar to the wire element 11 of Fig. 2. As shown, the cross-sectional area at the looped ends of the parallel sections has been reduced to focus the strain in these regions and thus permit a maximum change in the spacing between the parallel sections for a given deformation of the test object.

Figs. 8 and 9 are magnified views of a protective shield for shielding the gage measuring element from stray electrostatic and electromagnetic fields. In Figs. 8 and 9 the numeral 18 designates a cover which is bonded to the test object by the flanged section 19, and which is made of "neoprene" or other equivalent flexible insulating material that will not be affected by the cement or other bonding material used in bonding the gage and the cover to the test object. A closely-spaced flexible wire mesh 20 is encased within the cover and electrically connected to the test object by flat spring contacts 21 that project beyond the flanged section 19 and press against the test object. The connections to the resistance measuring element of the gage may also be encased in a "neoprene" sleeve 22 bonded to the protective shield. When bonded to the test object, the shield assembly should be as flexible as possible in order that the measurements will not be affected by the stiffness of the shield.

Various types of electrical measuring circuits may be employed to measure the resistance of the gage measuring element to a radio frequency current, and included among these are so-called impedance bridge circuits, potentiometric circuits and so-called twin-T or null networks. Fig. 10 shows by way of example a preferred measuring circuit of the impedance bridge type. In Fig. 10 the numeral 23 denotes the bridge generally, the arms of which comprise three fixed resistors $R_A$, $R_B$, and $R_P$ respectively, two variable capacitors $C_A$ and $C_P$ respectively, the former of which is calibrated, a fixed capacitor $C_N$, and a single-pole double-throw switch SW for switching the gage measuring element in and out of the circuit. The gage measuring element is connected in one of the arms of the bridge and acts as a series resistor $R_X$, with one of its ends at ground potential. An alternating current of radio frequency is supplied to the bridge circuit by means of an oscillator or signal generator 24 having a balanced output of low impedance such as 200 ohms, and a waveform relatively free from harmonics. The output of the bridge circuit is connected to a frequency selective detector 25 that is tuned to the frequency of the generator and incorporates a null-type indicating meter. The potential across the strain gage at maximum unbalance should normally be in the neighborhood of six volts, but it may vary from three to twenty volts. Also the individual circuit components and connections should be thoroughly shielded against electrostatic and electromagnetic pick-up.

In order to measure the resistance of the gage measuring element, the bridge is first balanced by means of capacitors $C_P$ and $C_A$ with the gage measuring element disconnected from the bridge circuit as will be the case when the single-pole double-throw switch (SW) is positioned at A. The switch (SW) is then positioned at B which connects the gage measuring element in the bridge circuit and the bridge is rebalanced. It can be shown that the resistance $R_X$ of the gage measuring element is given by the relation $$R_X = R_B \frac{(C_{A2} - C_{A1})}{C_N}$$

wherein the subscripts 1 and 2 denote the dial readings of $C_A$ for the initial and final balances, respectively. If now the test object is strained, the resistance of the gage measuring element will change by an increment $\Delta R$. By a measurement of the amount of this resistive change, and by reference to a curve or table relating various such resistive changes to values of strains, the particular value of the strain to which the test object is being subjected may be readily determined. Such a curve or table may be established experimentally for each specific type of gage measuring element before it is put to use.

The use to which the measuring apparatus of the present invention may be put is not necessarily limited to the measurement of strains, however, as will be apparent from the foregoing description. Rather the apparatus may be adapted to measure small displacements of various kinds by the provision of appropriate mechanical means for varying the spacing of conductor sections as a function of the particular displacements to be determined. Since such departures from the illustrative embodiments herein are obviously within the capabilities of those skilled in the art, they are intended to be included within the spirit and scope of the invention, and therefore what is claimed is:

1. Apparatus for measuring small displacements, said apparatus including a pair of electrical conductors spaced a small distance apart, means to vary the spacing of said conductors throughout a range of proximate spacings as a function of the displacements to be measured, means to pass an alternating current of radio frequency through said conductors, and means to measure changes in the resistance to said current of at least one of said conductors resulting from variations in the spacing of said conductors, the spacing of said conductors being sufficiently small in relation to the conductor size and current frequency as to cause a proximity effect resistance variation due to variations in the spacing of the conductors far in excess of resistance variations due to variations of strain in the conductors.

2. A strain gage including a pair of electrical conductors spaced a small distance apart, means to bond said conductors to the surfaces of objects whose strain is to be gaged, means to pass an alternating current of radio frequency through said conductors, and means to measure changes in the resistance to said current of at least one of said conductors resulting from variations in the spacing of said conductors, the spacing of said conductors being sufficiently small in relation to the conductor size and current frequency as to cause a proximity effect resistance variation due to variations in the spacing of the conductors far in excess of resistance variations due to variations of strain in the conductors.

3. A strain gage including a pair of electrical conductors spaced a small distance apart, means to sense movements of points on the surfaces of objects whose strain is to be gaged, means to translate said movements into variations in the spacing of said conductors throughout a range of proximate spacings, means to pass an alternating current of radio frequency through said conductors, and means to measure changes in the resistance to said current of at least one of said conductors resulting from variations in the spacing of said conductors, the spacing of said conductors being sufficiently small in relation to the conductor size and current frequency as to cause a proximity effect resistance variation due to variations in the spacing of the conductors far in excess of resistance variations due to variations of strain in the conductors.

4. A strain gage comprising an electrically conductive grid, said grid including parallel conductive sections spaced a small distance apart, means to bond said grid to the surfaces of objects whose strain is to be gaged, means to pass an alternating current of radio frequency through said grid, and means to measure changes in the resistance of said grid to said current resulting from variations in the spacing of said conductive sections, the spacing of said conductive sections being sufficiently small in relation to the conductive section size and current frequency as to cause a proximity effect resistance variation due to variations in the spacing of the conductive sections far in excess of resistance variations due to variations of strain in the conductive sections.

5. A strain gage comprising an electrically conductive grid, said grid being formed with two lengths of wire arranged in a zigzag pattern and being spaced apart a distance substantially less than the distance between corresponding sections of said zigzag pattern, means to rigidly attach said grid to the surfaces of objects whose strain is to be gaged, means to pass an alternating current of radio frequency through said grid, and means to measure changes in the resistance of said grid to said current resulting from variations in the spacing of said lengths of wire, the spacing of said wires being sufficiently small in relation to the wire size and current frequency as to cause a proximity effect resistance variation due to variations in the spacing of the wires far in excess of resistance variations due to variations of strain in the wires.

6. A strain gage comprising a deformable base member of insulating material, an electrically conductive grid bonded to said base member, said grid including parallel conductive sections spaced a small distance apart, a deformable electrostatic shield overlying said base member, means to rigidly attach said base member and said shield to the surfaces of objects whose strain is to be gaged, means to pass an alternating current of radio frequency through said grid, and means to measure changes in the resistance of said grid to said current resulting from variations in the spacing of said conductors, the spacing of said conductive sections being sufficiently small in relation to the conductive section size and current frequency as to cause a proximity effect resistance variation due to variations in the spacing of the conductive sections far in excess of resistance variations due to variations of strain in the conductive sections.

References Cited in the file of this patent

UNITED STATES PATENTS

| | | |
|---|---|---|
| 2,363,181 | Howland | Nov. 21, 1944 |
| 2,494,596 | Vahle | Jan. 17, 1950 |
| 2,525,587 | Cahn | Oct. 10, 1950 |
| 2,582,886 | Ruge | Jan. 15, 1952 |
| 2,599,578 | Obert et al. | June 10, 1952 |
| 2,633,019 | Albrecht et al. | Mar. 31, 1953 |

FOREIGN PATENTS

| | | |
|---|---|---|
| 610,077 | Great Britain | Oct. 11, 1948 |

OTHER REFERENCES

Ware and Reed: "Communication Circuits," published by John Wiley & Sons, Inc., New York, 1942, pages 14 and 15.